(12) United States Patent
Hong et al.

(10) Patent No.: US 7,168,665 B2
(45) Date of Patent: Jan. 30, 2007

(54) DISPLAY APPARATUS

(75) Inventors: You-sik Hong, Suwon (KR); Seon-kyu Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/406,269

(22) Filed: Apr. 4, 2003

(65) Prior Publication Data

US 2004/0004165 A1 Jan. 8, 2004

(30) Foreign Application Priority Data

Jul. 6, 2002 (KR) .................................. 2002-39139

(51) Int. Cl.
*A47F 5/00* (2006.01)

(52) U.S. Cl. .............................. 248/125.1; 248/125.2; 248/917; 361/682

(58) Field of Classification Search .............. 248/286.1, 248/125.2, 370, 123.2, 317, 320, 325, 917, 248/918, 125.1, 132; 108/147
See application file for complete search history.

(56) References Cited

U.S. PATENT DOCUMENTS

| | | | |
|---|---|---|---|
| 2,041,370 A | 5/1936 | Vear | |
| 2,628,142 A | 2/1953 | Ema | |
| 2,890,010 A | 6/1959 | Barkheimer | |
| 3,788,587 A | 1/1974 | Stemmler | |
| 4,113,215 A | 9/1978 | Stapleton | |
| 4,166,522 A | 9/1979 | Bourcier de Carbon | |
| 4,235,405 A | * 11/1980 | Carey | 248/123.11 |
| 4,329,800 A | 5/1982 | Shuman | |

(Continued)

FOREIGN PATENT DOCUMENTS

| | | |
|---|---|---|
| CN | 1031010 C | 2/1996 |
| CN | 2504675 | 8/2002 |
| DE | 2847135 | 5/1980 |
| DE | 39 43 137 A1 | 8/1991 |
| DE | 29710832 * | 8/1997 |
| DE | 200 09 691 | 11/2000 |
| DE | 4214341 A1 | 7/2003 |
| EP | 0 046 225 | 2/1982 |

(Continued)

OTHER PUBLICATIONS

Korean Office Action issued on Mar. 8, 2006 in Korean Patent Application No. 10-2002-0050351 which corresponds to co-pending U.S. Appl. No. 10/646,864.
U.S. Appl. No. 10/295,831, filed Nov. 18, 2002, Hyun-jun Jung et al., Samsung Electronics Co. Ltd.
U.S. Appl. No. 10/314,350, filed Dec. 1, 2002, Sang-kyeong Ha et al., Samsung Electronics Co. Ltd.
U.S. Appl. No. 10/646,864, filed Apr. 1, 2003, You-Sik Hong et al., Samsung Electronics Co. Ltd.

(Continued)

*Primary Examiner*—Anita King
*Assistant Examiner*—Tan Le
(74) *Attorney, Agent, or Firm*—Staas & Halsey LLP (57) ABSTRACT

A display apparatus having a display main body provided with a screen, and a base unit to support the display main body. The display apparatus includes a supporting unit provided between the display main body and the base unit to support the display main body to be lifted up and lowered down, a gearing unit to cooperate with the up and down lifting/lowering of the display main body, and an auxiliary base part ejected from and inserted in the base unit according to an operation of the gearing unit. Thus, the present invention provides a display apparatus in which a size of a base part to support a display main body is optimized according to a height of the display main body.

23 Claims, 9 Drawing Sheets

U.S. PATENT DOCUMENTS

| | | |
|---|---|---|
| 4,339,104 A | 7/1982 | Weidman |
| 4,395,010 A | 7/1983 | Helgeland et al. |
| 4,438,458 A | 3/1984 | Müscher |
| 4,447,031 A | 5/1984 | Souder, Jr. et al. |
| 4,601,246 A | 7/1986 | Damico |
| 4,669,694 A | 6/1987 | Malick |
| 4,690,362 A | 9/1987 | Helgeland |
| 4,691,886 A | 9/1987 | Wedling et al. |
| 4,729,533 A | 3/1988 | Hillary et al. |
| D295,415 S | 4/1988 | Thies et al. |
| 4,768,744 A | 9/1988 | Leeds et al. |
| 4,777,750 A | 10/1988 | Garfinkle |
| 4,834,329 A | 5/1989 | Delapp |
| 4,846,434 A | 7/1989 | Krogsrud |
| 4,859,092 A | 8/1989 | Makita |
| 4,864,601 A | 9/1989 | Berry |
| D313,405 S | 1/1991 | Barry et al. |
| 4,989,813 A | 2/1991 | Kim et al. |
| 5,012,852 A | 5/1991 | Blackhurst |
| 5,088,676 A | 2/1992 | Orchard et al. |
| 5,102,084 A | 4/1992 | Park |
| 5,107,402 A | 4/1992 | Malgouires |
| 5,112,019 A * | 5/1992 | Metzler et al. .............. 248/405 |
| 5,144,290 A | 9/1992 | Honda et al. |
| 5,163,652 A | 11/1992 | King |
| 5,206,790 A | 4/1993 | Thomas et al. |
| D337,104 S | 7/1993 | Orchard |
| D349,489 S | 8/1994 | Wang |
| 5,335,142 A | 8/1994 | Anderson |
| 5,383,138 A | 1/1995 | Motoyama et al. |
| 5,422,951 A | 6/1995 | Takahashi et al. |
| 5,437,236 A | 8/1995 | Zeiner |
| 5,751,548 A | 5/1998 | Hall et al. |
| 5,758,849 A * | 6/1998 | Bui et al. ................. 248/125.1 |
| 5,771,152 A | 6/1998 | Crompton et al. |
| 5,799,917 A | 9/1998 | Li |
| 5,812,368 A | 9/1998 | Chen et al. |
| 5,835,342 A | 11/1998 | Hunte |
| 5,876,008 A | 3/1999 | Sweere et al. |
| 5,911,523 A | 6/1999 | Burchart |
| 5,924,665 A | 7/1999 | Sweere et al. |
| 5,941,493 A | 8/1999 | Cheng |
| 5,975,472 A | 11/1999 | Hung |
| 5,992,809 A | 11/1999 | Sweere et al. |
| 5,997,493 A | 12/1999 | Young |
| 6,012,693 A | 1/2000 | Voeller et al. |
| 6,015,120 A | 1/2000 | Sweere et al. |
| 6,018,847 A | 2/2000 | Lu |
| 6,031,714 A | 2/2000 | Ma |
| 6,062,148 A | 5/2000 | Hodge et al. |
| 6,081,420 A | 6/2000 | Kim et al. |
| 6,113,046 A | 9/2000 | Wang |
| 6,116,690 A | 9/2000 | Larson |
| 6,134,103 A | 10/2000 | Ghanma |
| 6,164,611 A | 12/2000 | Kuhnke |
| 6,168,124 B1 | 1/2001 | Matsuoka et al. |
| 6,189,842 B1 | 2/2001 | Bergeron Gull et al. |
| 6,189,849 B1 * | 2/2001 | Sweere et al. ........... 248/286.1 |
| 6,189,850 B1 | 2/2001 | Liao et al. |
| 6,233,138 B1 | 5/2001 | Osgood |
| 6,270,047 B1 | 8/2001 | Hudson |
| 6,266,794 B1 | 9/2001 | Harbin |
| 6,286,794 B1 * | 9/2001 | Harbin .................... 248/123.2 |
| 6,288,891 B1 | 9/2001 | Hasegawa et al. |
| 6,305,659 B1 | 10/2001 | Metelski |
| 6,347,433 B1 | 2/2002 | Novin et al. |
| 6,352,226 B1 * | 3/2002 | Gordon .................... 248/125.2 |
| 6,367,756 B1 | 4/2002 | Wang |
| 6,381,125 B1 * | 4/2002 | Mizoguchi et al. ......... 361/682 |
| 6,390,433 B1 * | 5/2002 | Kasa-Djukic ............. 248/441.1 |
| 6,394,403 B1 | 5/2002 | Hung |
| 6,397,761 B1 | 6/2002 | Moore |
| 6,402,109 B1 | 6/2002 | Dittmer |
| 6,409,134 B1 | 6/2002 | Oddsen, Jr. |
| 6,430,038 B1 | 8/2002 | Helot et al. |
| 6,478,275 B1 | 11/2002 | Huang |
| 6,494,150 B1 * | 12/2002 | Phoenix et al. .............. 108/147 |
| 6,499,704 B2 * | 12/2002 | Oddsen, Jr. .............. 248/125.1 |
| 6,502,792 B1 | 1/2003 | Cho et al. |
| 6,522,530 B2 | 2/2003 | Bang |
| 6,585,201 B1 | 7/2003 | Reed |
| 6,592,090 B1 * | 7/2003 | Li ........................... 248/284.1 |
| 6,609,686 B2 | 8/2003 | Malizia |
| 6,672,533 B1 | 1/2004 | Lin |
| 6,680,843 B2 | 1/2004 | Farrow et al. |
| 6,695,266 B1 | 2/2004 | Tsai |
| 6,695,274 B1 | 2/2004 | Chiu |
| 6,702,238 B1 | 3/2004 | Wang |
| 6,708,940 B2 | 3/2004 | Ligertwood |
| 6,712,321 B1 | 3/2004 | Su et al. |
| D489,370 S | 5/2004 | Jobs et al. |
| 6,766,994 B2 | 7/2004 | Serbinski et al. |
| 6,769,657 B1 | 8/2004 | Huang |
| 6,819,550 B2 | 11/2004 | Jobs et al. |
| 6,822,857 B2 | 11/2004 | Jung et al. |
| 6,837,469 B2 | 1/2005 | Wu et al. |
| 6,857,610 B1 | 2/2005 | Conner et al. |
| 6,889,958 B2 | 2/2005 | Hoffend, Jr. |
| 2001/0017761 A1 | 8/2001 | Ditzik |
| 2003/0080949 A1 | 5/2003 | Ditzik |
| 2003/0086240 A1 | 5/2003 | Jobs et al. |
| 2004/0004165 A1 * | 1/2004 | Hong et al. ................. 248/132 |
| 2005/0011932 A1 | 1/2004 | Duff et al. |
| 2004/0056161 A1 | 3/2004 | Ishizaki et al. |
| 2004/0084585 A1 | 5/2004 | Watanabe et al. |
| 2004/0084588 A1 | 5/2004 | Liu et al. |
| 2004/0118984 A1 | 6/2004 | Kim et al. |
| 2002/0011544 A1 | 1/2005 | Bosson |
| 2004/0057197 A1 | 3/2005 | Hill et al. |
| 2003/0075649 A1 | 4/2005 | Jeong et al. |
| 2003/0075653 A1 | 4/2005 | Li |
| 2003/0132360 A1 | 7/2005 | Ju |
| 2003/0142474 A1 | 7/2005 | Karidis et al. |
| 2002/0130981 A1 | 9/2005 | Ma et al. |

FOREIGN PATENT DOCUMENTS

| | | |
|---|---|---|
| EP | 244 566 | 11/1987 |
| EP | 631 174 B1 | 4/1998 |
| EP | 1085753 | 3/2001 |
| GB | 2 206 464 | 1/1989 |
| JP | 57-151990 | 9/1982 |
| JP | 61-99873 | 5/1986 |
| JP | 61-99874 | 5/1986 |
| JP | 61-196314 | 9/1986 |
| JP | 62-96681 | 5/1987 |
| JP | 62-96682 | 6/1987 |
| JP | 62-239677 | 10/1987 |
| JP | 1-273086 | 10/1989 |
| JP | 2-58783 | 4/1990 |
| JP | 2-215408 | 8/1990 |
| JP | 02-215408 | 8/1990 |
| JP | 03-2381 | 1/1991 |
| JP | 03-29800 | 3/1991 |
| JP | 3-095586 | 4/1991 |
| JP | 03-095586 | 4/1991 |
| JP | 03-113423 | 11/1991 |
| JP | 03-114875 | 11/1991 |
| JP | 4-15680 | 1/1992 |
| JP | 4-33073 | 3/1992 |
| JP | 04-33073 | 3/1992 |
| JP | 04-81182 | 3/1992 |

| | | |
|---|---|---|
| JP | 4-107284 | 4/1992 |
| JP | 4-155375 | 5/1992 |
| JP | 4-198979 | 7/1992 |
| JP | 3-017022 | 9/1992 |
| JP | 4-132517 | 12/1992 |
| JP | 5-36523 | 2/1993 |
| JP | 5-097098 | 4/1993 |
| JP | 05-36423 | 5/1993 |
| JP | 5-188865 | 7/1993 |
| JP | 05-66715 | 9/1993 |
| JP | 6-4778 | 1/1994 |
| JP | 6-37912 | 2/1994 |
| JP | 6-21079 | 3/1994 |
| JP | 6-118880 | 4/1994 |
| JP | 8-121009 | 5/1996 |
| JP | 8-234672 | 9/1996 |
| JP | 8-319753 | 12/1996 |
| JP | 10-126068 | 5/1998 |
| JP | 10-214034 | 8/1998 |
| JP | 10-228333 | 8/1998 |
| JP | 11-006520 | 1/1999 |
| JP | 11-095866 | 4/1999 |
| JP | 11-154460 | 6/1999 |
| JP | 11-214859 | 8/1999 |
| JP | 11-338576 | 12/1999 |
| JP | 2000-019981 | 1/2000 |
| JP | 3068198 | 2/2000 |
| JP | 2000-56695 | 2/2000 |
| JP | 2000-122561 | 4/2000 |
| JP | 2000-206893 | 7/2000 |
| JP | 2000-206901 | 7/2000 |
| JP | 3073553 | 9/2000 |
| JP | 200267581 | 9/2000 |
| JP | 2000-242363 | 9/2000 |
| JP | 2001-50244 | 2/2001 |
| JP | 2001-142407 | 5/2001 |
| JP | 2001-202026 | 7/2001 |
| JP | 2001-241427 | 9/2001 |
| JP | 20026990 | 1/2002 |
| KR | 1989-3755 | 6/1989 |
| KR | 88-3444 | 10/1989 |
| KR | 89-20328 | 10/1989 |
| KR | 1991-0009310 | 5/1991 |
| KR | 114350 | 11/1997 |
| KR | 1997-63717 | 12/1997 |
| KR | 1998-4698 | 3/1998 |
| KR | 163133 | 9/1998 |
| KR | 1998-54989 | 12/1998 |
| KR | 1999-40596 | 6/1999 |
| KR | 1999-0040596 | 6/1999 |
| KR | 1999-0073869 | 10/1999 |
| KR | 20-168389 | 11/1999 |
| KR | 2000-722 | 1/2000 |
| KR | 2000-725 | 1/2000 |
| KR | 2000-827 | 1/2000 |
| KR | 20-182808 | 3/2000 |
| KR | 20-184275 | 3/2000 |
| KR | 20-0178710 | 4/2000 |
| KR | 20-0191805 | 8/2000 |
| KR | 20-215332 | 12/2000 |
| KR | 2000-73608 | 12/2000 |
| KR | 2002/5136 | 2/2001 |
| KR | 10-0289438 | 2/2001 |
| KR | 20-227925 | 4/2001 |
| KR | 20-227953 | 4/2001 |
| KR | 2001-35722 | 5/2001 |
| KR | 2001-0035722 | 5/2001 |
| KR | 20-239991 | 7/2001 |
| KR | 2001-53963 | 7/2001 |
| KR | 2001-56960 | 7/2001 |
| KR | 2001-83865 | 9/2001 |
| KR | 20-251611 | 10/2001 |
| KR | 20-256809 | 11/2001 |
| KR | 20-0253576 | 11/2001 |
| KR | 20-0256013 | 11/2001 |
| KR | 20-259625 | 12/2001 |
| KR | 2002-51360 | 1/2002 |
| KR | 2002-0029616 | 4/2002 |
| KR | 20-279427 | 6/2002 |
| KR | 20-0279427 | 6/2002 |
| KR | 10-353035 | 9/2002 |
| KR | 20-295990 | 11/2002 |
| KR | 20-304340 | 2/2003 |
| KR | 2003-0058204 | 7/2003 |
| KR | 20-0227925 | 6/2004 |

OTHER PUBLICATIONS

U.S. Appl. No. 10/671,605, filed Sep. 1, 2003, Jun–soo Jeong, Samsung Electronics Co. Ltd.
U.S. Appl. No. 10/671,863, filed Sep. 1, 2003, Ju–hwan Kim et al., Samsung Electronics Co. Ltd.
U.S. Appl. No. 10/694,029, filed Oct. 1, 2003, Nam–il Cho et al., Samsung Electronics Co. Ltd.
U.S. Appl. No. 10/694,041, filed Oct. 1, 2003, You–Sub Lee et al., Samsung Electronics Co. Ltd.
U.S. Appl. No. 10/705,770, filed Nov. 1, 2003, Ju–hwan Kim et al., Samsung Electronics Co. Ltd.
U.S. Appl. No. 10/792,745, filed Mar. 1, 2004, Sang–kyeong Ha et al., Samsung Electronics Co., Ltd.
U.S. Appl. No. 10/916,436, filed Aug. 12, 2004, Hyun–jun Jung et al., Samsung Electronics Co. Ltd.
U.S. Appl. No. 10/916,447, filed Aug. 12, 2004, Hyun–jun Jung et al., Samsung Electronics Co. Ltd.
Vesa Mounting Interfaces Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Copy of Chinese Office Action of Application No. 03110326.X issued Sep. 24, 2004.
Copy of Chinese Office Action of Application No. 03154931.4 issued Sep. 9, 2005.
Copy of Singapore Office Action issued on May 13, 2005.
Copy of Korean Office Action issued on Jul. 26, 2004.
Copy of Japanese Office Action mailed Sep. 21, 2004 in JP 2002–333914.
Copy of Japanese Office Action mailed Jun. 14, 2005 in JP 2002–333914.
Copy of Korean Office Action issued on Mar. 16, 2005.
Copy of Korean Office Action issued on Aug. 20, 2004.
Copy of SIPO Office Action issued on Sep. 9, 2005.
U.S. Appl. No. 6,822,857.
U.S. Appl. No. 10/646,864, filed Apr. 2003, You–Sik Hong et al., Samsung Electronics Co., Ltd.
U.S. Appl. No. 10/694,041, filed Oct. 2003, You–Sub Lee et al., Samsung Electronics Co., Ltd.
U.S. Appl. No. 10/694,029, filed Oct. 2003, Nam–il Cho et al., Samsung Electronics Co., Ltd.
U.S. Appl. No. 10/671,863, filed Sep. 2003, Ju–hwan Kim et al., Samsung Electronics Co., Ltd.
U.S. Appl. No. 10/705,770, filed Nov. 11, 2003, Ju–hwan Kim et al., Samsung Electronics Co., Ltd.
U.S. Appl. No. 10/792,745, filed Mar. 2004, Sang–kyeong Ha et al., Samsung Electronics Co., Ltd.
Chinese Office Action of Application No. 03110326.X, filed Sep. 9, 2005.

* cited by examiner

DISPLAY APPARATUS

CROSS REFERENCE TO RELATED APPLICATION

This application claims the benefit of Korean Application No. 2002-39139, filed Jul. 6, 2002, in the Korean Intellectual Property Office, the disclosure of which is incorporated herein by reference.

BACKGROUND OF THE INVENTION

1. Field of the Invention

The present invention relates to a display apparatus, and more particularly, to a display apparatus improved in a structure of a display main body and a base part.

2. Description of the Related Art

Generally, a display apparatus includes a display main body provided with a screen, and a base part to be set on an installation surface to support the display main body.

Recently, the screen of the display main body has been manufactured with an LCD (liquid crystal display), a PDP (plasma display panel), etc., so that the display apparatus may have a large-sized and thin display main body. Hence, there is a growing trend toward a large-sized thin display apparatus. There is needed a device to easily set the large-sized display main body onto an installation surface such as a wall, a horizontal surface, etc.

Hereinbelow, a case where the display main body is set on a horizontal surface will be described.

Figure 1:
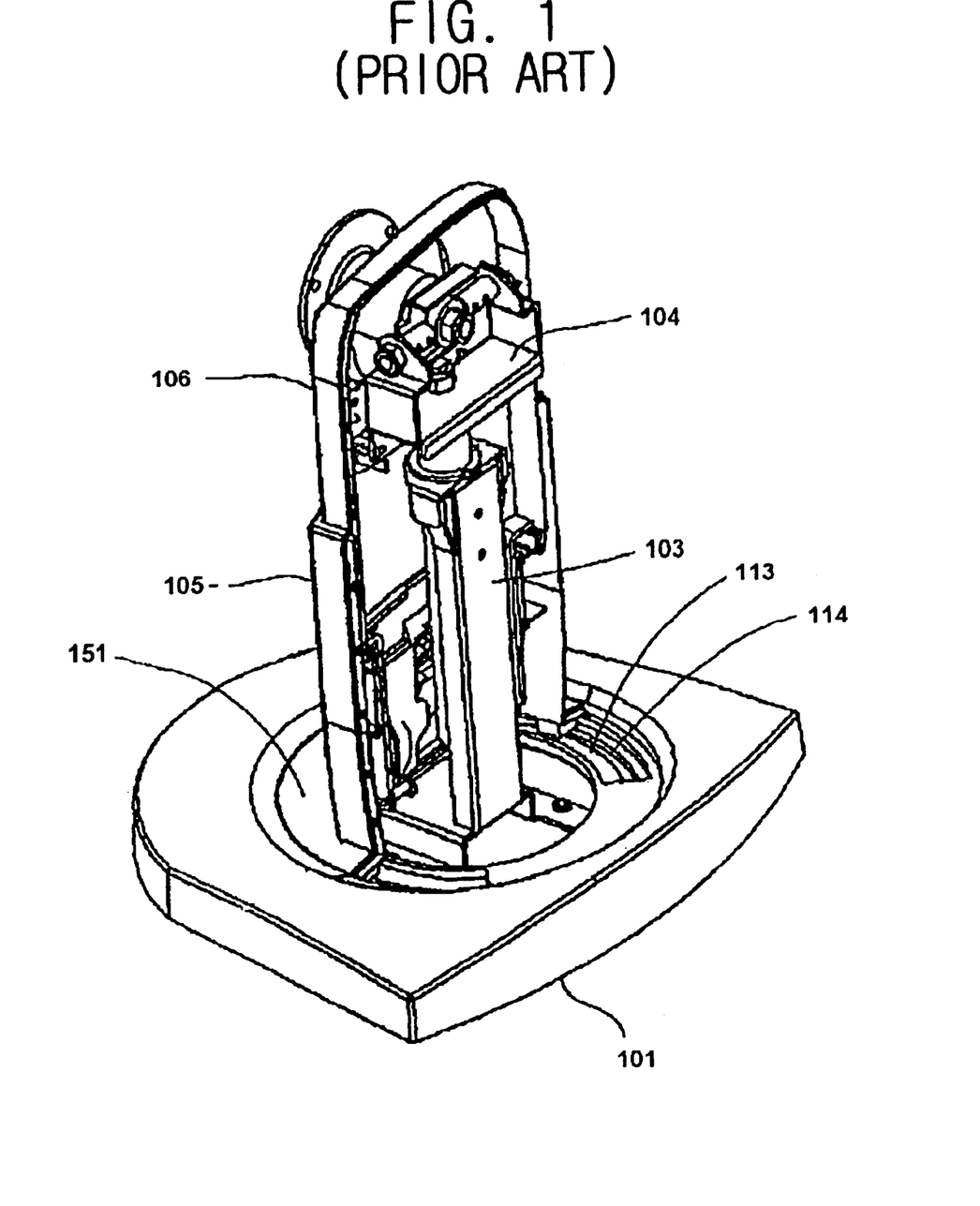
FIG. 1 is a rear perspective view of a conventional display apparatus.
Figure 2:
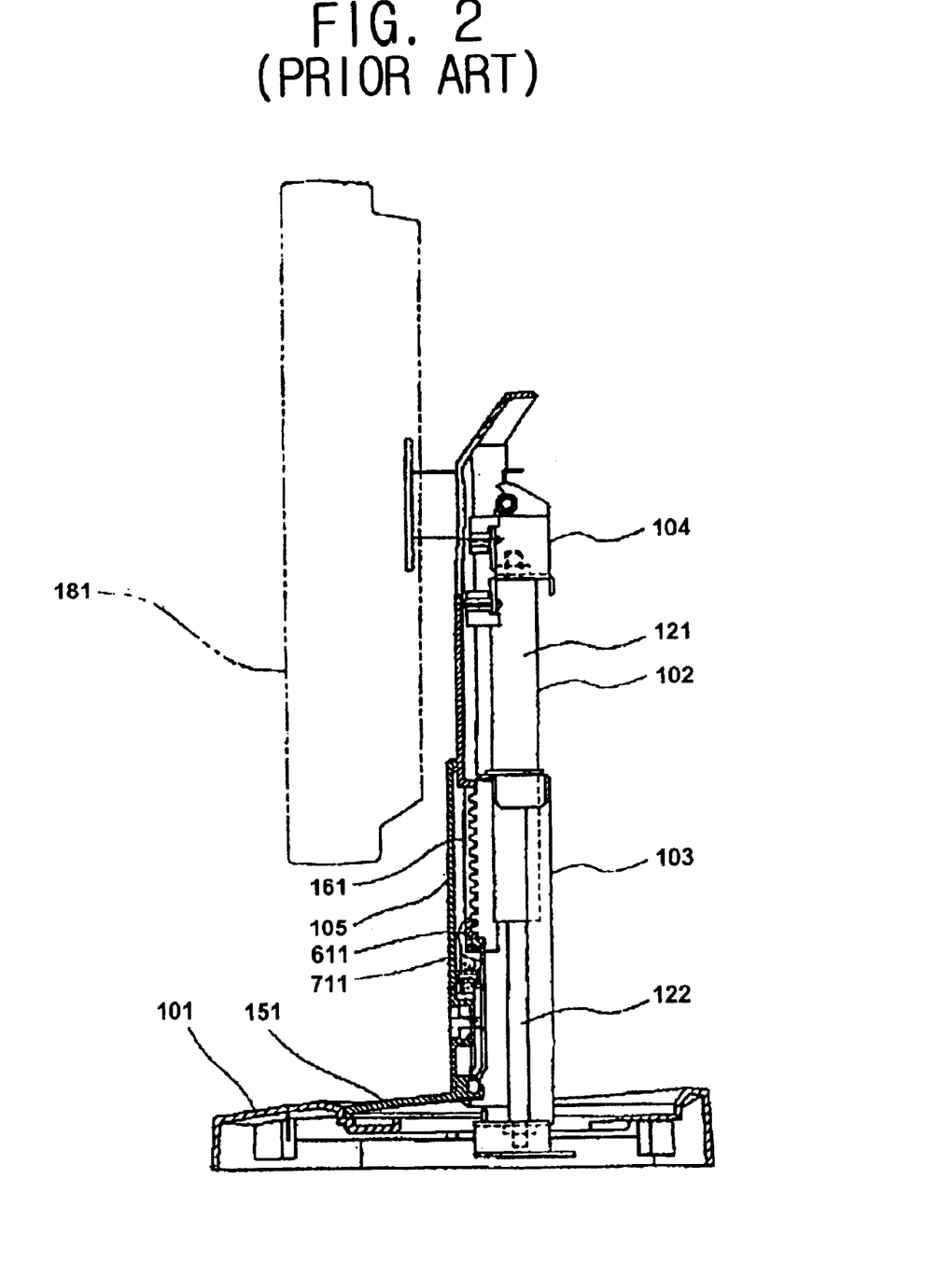
FIG. 2 is a side sectional view of the conventional display apparatus in FIG. 1.

There has been proposed a height controller for an LCD display apparatus to be set on a horizontal surface in Japanese Patent Publication No. 2000-206893. As shown in FIGS. 1 and 2, a conventional LCD display apparatus includes an LCD display main body 181, a base part 101, an air cylinder assembly 102 having a cylinder 121 and a rod 122 to telescopically combine with the cylinder 121, and a supporting frame 103 to combine the air cylinder assembly 102 to the base part 101. The conventional LCD display apparatus also includes an upper frame 104 which is combined to an upper part of the air cylinder assembly 102 and to which the LCD display main body 181 is combined, a lower casing 105 mounted on the base part 101, and an upper casing 106. With the configuration as described above, a height of the LCD display apparatus may be controlled by lengthening or shortening a length of the rod 122 to the cylinder 121.

Herein, the length of the rod 122 to the cylinder 121 is controlled by engagement of the upper and lower casings 106 and 105. In regard to the engagement, a lower part of the upper casing 106 is provided with a height determining part 161 including grooves 611 at regular intervals. The lower casing 105 is provided with an engaging member 711 engaged with the groove 611. Thus, when a user wants to control the height of the LCD display main body 181, the engagement of the upper and lower casings 106 and 105 is released by pushing the engaging member 711.

Further, the base part 101 includes a guiding groove 113 having a circular shape, and a through hole 114 formed on the guiding groove 113 and having an arc shape. Correspondingly, a bottom of the lower casing 105 is provided with a circular plate 151 to be guided by the guiding groove 113.

Consequently, the user may not only control the height of the LCD display main body 181 through the air cylinder assembly 102, but also rotate the LCD display main body 181 about an axis of the rod 122 through the guiding groove 113 and the circular plate 151.

On the other hand, in the conventional display apparatus, the LCD display main body is relatively small because it is generally used as a monitor for a personal computer. Moreover, the base part to support the relatively small LCD display main body is also small. Therefore, the conventional display apparatus occupies a relatively small space.

However, due to the recently large size of the display main body, the base part to support the display main body should have a large size in proportion to the size of the display main body, so that the display apparatus having the large-sized LCD display main body occupies a relatively large space. Further, in the case of the display apparatus capable of controlling the height of the LCD display main body, the higher the height of the LCD display main body is controlled, the larger the base part should be. That is, in order to make the base part support the LCD display main body stably, the size of the base part must be designed in consideration of a case where the LCD display main body has the highest height. Therefore, the conventional base part is designed to occupy a constant space regardless of the height of the LCD display main body. That is, the base part occupies a relatively large space regardless of the height of the LCD display main body.

The conventional height controller for the LCD display main body 181 is provided with the supporting frame 103 to support the LCD display main body 181, but it is inadequate for the large-sized LCD display main body.

Further, the conventional height controller includes the height determining part 161 having the grooves 611, and the engaging member 711 engaged with the grooves 611, so that the structure thereof is complicated and control of the height is difficult.

SUMMARY OF THE INVENTION

Accordingly, it is an object of the present invention to provide a display apparatus in which a size of a base part to support a display main body is optimized according to a height of the display main body.

Another object of the present invention is to provide a display apparatus which includes a reinforcing member so that a display main body is stably supported even when the display main body is lifted up or lowered down, and a cylinder unit operated by a valve so that a structure thereof is simple, height control is provided, and the display main body is easily lifted up and lowered down by a small force.

Additional objects and advantages of the invention will be set forth in part in the description which follows and, in part, will be obvious from the description, or may be learned by practice of the invention.

The foregoing and/or other objects of the present invention are achieved by providing a display apparatus having a display main body provided with a screen, and a base unit to support the display main body. The display apparatus includes a supporting unit provided between the display main body and the base unit to support the display main body to be lifted up and lowered down. The display apparatus also includes a gearing unit to cooperate with the up and down lifting/lowering of the display main body, and an auxiliary base part ejected from and inserted in the base unit according to operation of the gearing unit.

According to an aspect of the invention, the supporting unit includes a cylinder unit having a cylinder filled with high-pressure gas, a piston dividing the cylinder into two chambers to slide up and down in the cylinder, a piston rod inserted in a lower part of the cylinder and coupled to a bottom part of the piston, and a cylinder cover to accommodate and support the cylinder and the piston rod.

According to an aspect of the invention, an upper part of the cylinder is combined to the display main body, and a lower part of the piston is combined to the base unit.

According to an aspect of the invention, the cylinder unit further includes a valve disposed on the piston to open and close a passageway between the two chambers divided by the piston.

According to an aspect of the invention, the cylinder unit further includes a valve rod accommodated in a valve rod accommodating part formed inside the piston rod in a longitudinal direction and having an upper end coupled to the valve, and a valve control lever coupled to a lower end of the valve rod to protrude from the base unit so as to open and close the valve.

According to another aspect of the invention, the display apparatus further includes a lower casing to accommodate the cylinder unit and combined to the base unit, and an upper casing to accommodate the lower casing and combined to the display main body to be lifted up and lowered down.

According to an aspect of the invention, the gearing unit includes a first roller rotatably combined to an upper part of the lower casing to be rotated depending on the up and down lifting/lowering of the upper casing, a second roller rotatably combined to the base unit and a belt to transmit a rotary motion of the first roller to the second roller. The auxiliary base part is ejected from and inserted in the base unit depending upon the rotary motion of the second roller.

According to yet another aspect of the invention, the display apparatus further includes a reinforcing member accommodated in the upper casing and fastened to an upper part of the upper casing, and a guide rail provided in the lower casing to slidingly support a reinforcing member.

According to an aspect of the invention, the reinforcing member is provided with a contact pad on a lower part thereof so as to be accommodated and to slide in the guide rail of the lower casing.

According to an aspect of the invention, the reinforcing member is provided with a first rack in a lengthwise direction thereof, and the first roller has a first pinion to mesh with the first rack.

According to an aspect of the invention, the auxiliary base part is provided with a second rack in an ejecting and inserting direction thereof, and the second roller has a second pinion to mesh with the second rack.

According to another aspect of the invention, the display apparatus further includes a hinge unit provided between the display main body and the cylinder unit to swivel the display main body about the cylinder unit.

According to another aspect of the invention, the hinge unit includes a pair of main body brackets fastened to a rear of the display main body, a hinge shaft rotatably combined to the main body brackets, and a hinge bracket having a first part coupled to the hinge shaft and a second part coupled to an upper part of the cylinder unit.

BRIEF DESCRIPTION OF THE DRAWINGS

The above and other objects and advantages of the present invention will become apparent and more appreciated from the following description of the preferred embodiments, taken in conjunction with the accompany drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3:
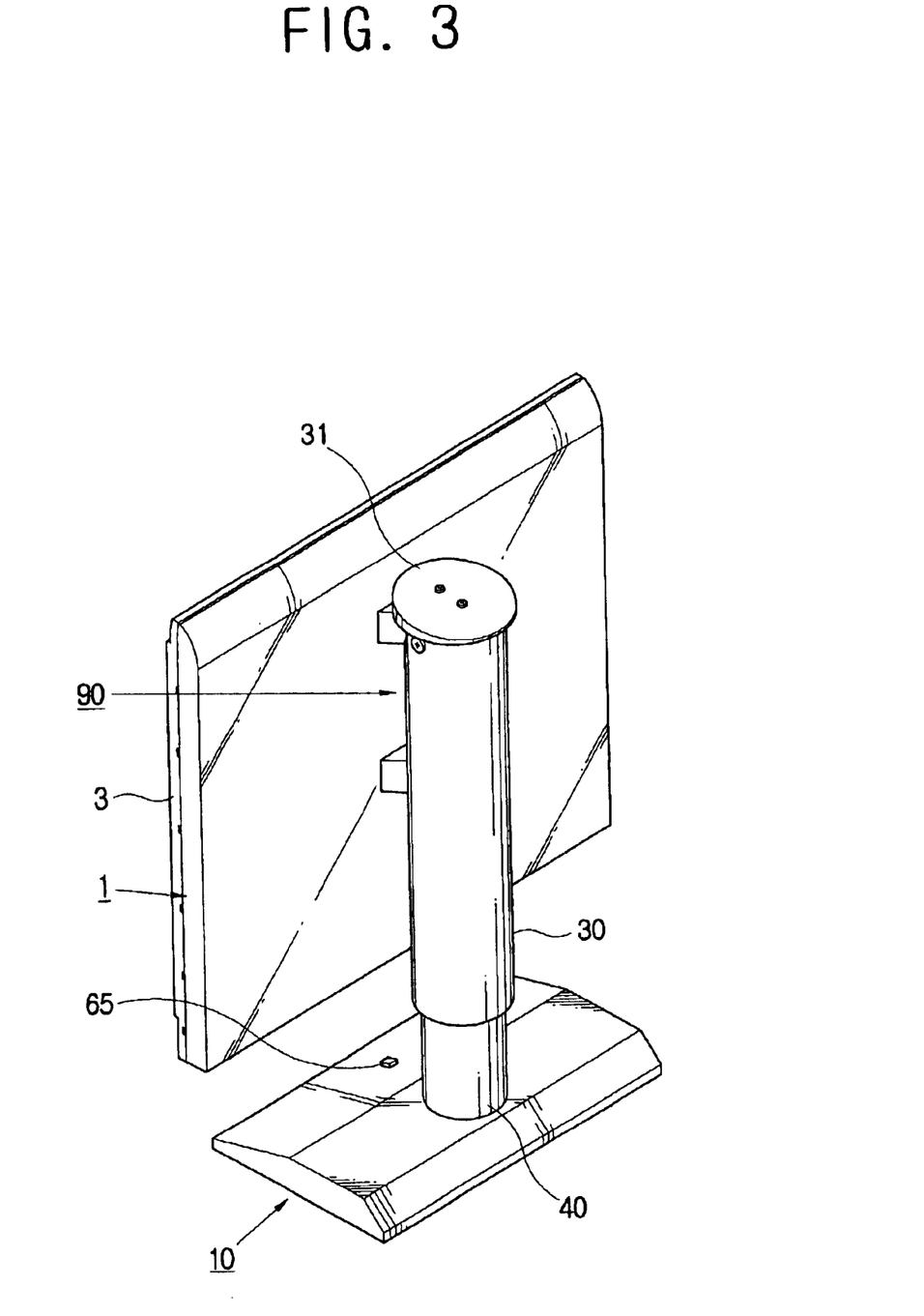
FIG. 3 is a rear perspective view of a display apparatus, according to an embodiment of the present invention.
Figure 4:
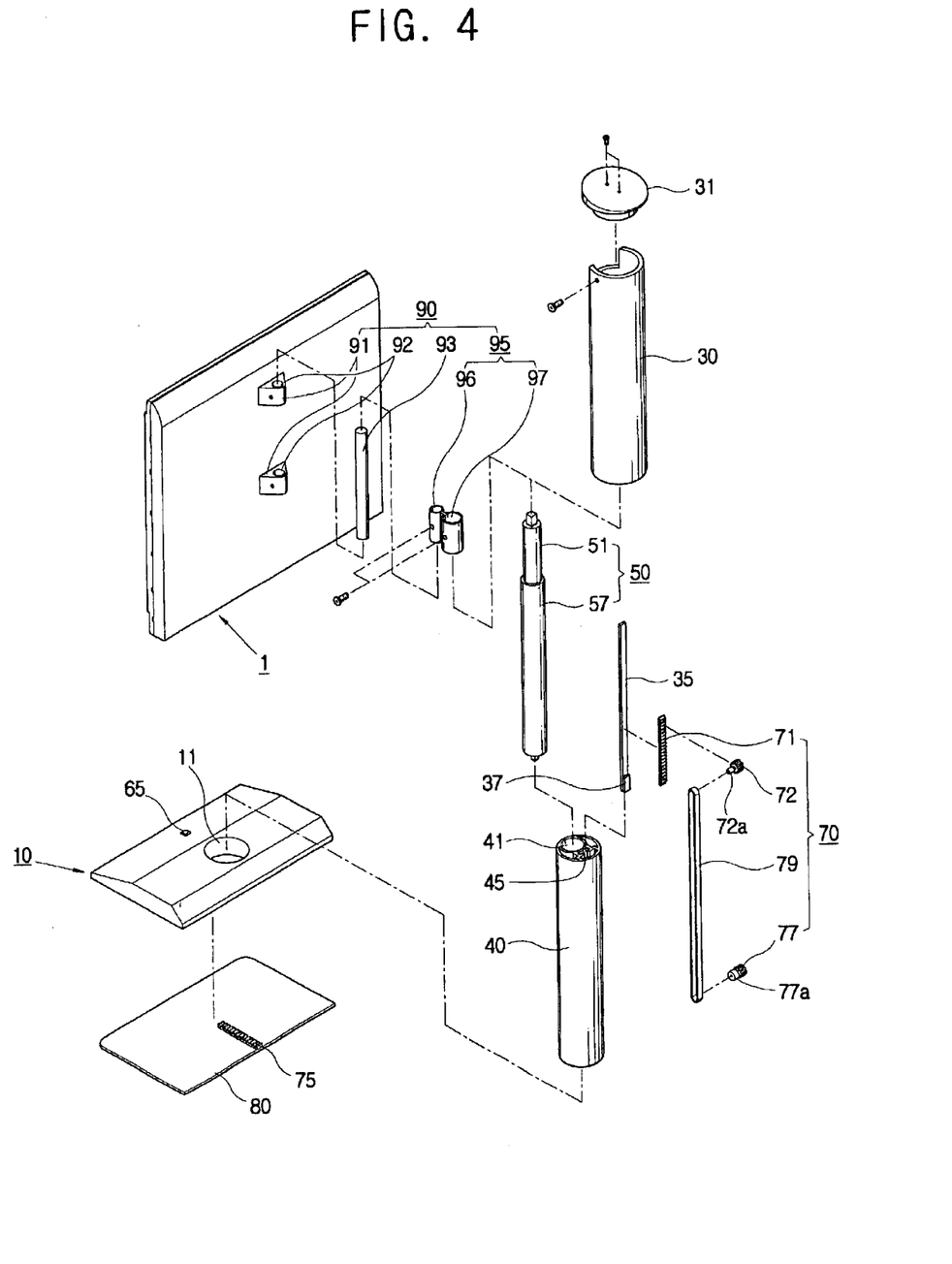
FIG. 4 is an exploded perspective view of the display apparatus shown in FIG. 3.

As shown in FIGS. 3 and 4, a display apparatus according to an embodiment of the present invention includes a display main body 1 provided with a screen 3, a base unit 10 to set the display main body 1 on an installation surface, and a cylinder unit 50 provided between the display main body 1 and the base unit 10 to support the display main body 1 and to be lifted up and lowered down. Further, the display apparatus includes a hinge unit 90 provided between the display main body 1 and the cylinder unit 50 to swivel the display main body 1 about the cylinder unit 50, a gearing unit 70 provided between the display main body 1 and the base unit 10 to cooperate with the up and down lifting/lowering of the display main body 1, and an auxiliary base part 80 which is ejected from and inserted in the base unit 10 according to an operation of the gearing unit 70.

In front of the display main body 1 is provided the screen 3, which is manufactured with an LCD, PDP, etc., and in a rear thereof is provided a pair of main body brackets 91 of the hinge unit 90.

The hinge unit 90 includes the pair of main body brackets 91 fastened to the rear of the display main body 1, a hinge shaft 93 rotatably combined to the main body brackets 91, and a hinge bracket 95 having a first cylinder part 96 coupled to the hinge shaft 93 and a second cylinder part 97 coupled to an upper part of a cylinder 51 of the cylinder unit 50 (to be described later). Thus, the display main body 1 swivels about the cylinder unit 50 within a predetermined angle range.

The main body brackets 91 are fastened to the rear of the display main body 1 with a plurality of screws, and is formed with a hinge hole 92 in which the hinge shaft 93 is rotatably inserted. The hinge shaft 93 is shaped like a rod, so that opposite ends thereof are disposed in the hinge hole 92 of the main body bracket 91 and a middle part thereof is fastened into the first cylinder part 96 of the hinge bracket 95 with a screw. The hinge bracket 95 is provided with the first cylinder part 96 to which the hinge shaft 93 is inserted and fastened with the screw, and the second cylinder part 97 to which the upper part of the cylinder 51 is inserted and fastened with the screw, thereby rotatably combining the hinge shaft 93 to the upper part of the cylinder 51 of the cylinder unit 50.

There is also needed a supporting unit between the display main body 1 and the base member 10 so as to support the display main body 1 to be lifted up and lowered down. The supporting unit according to the present invention includes the cylinder unit 50, a lower casing 40 to accommodate the cylinder unit 50 and combined to the base unit 10, and an upper casing 30 to accommodate the lower casing 40 and combined to the display main body 1 to be lifted up and lowered down. Herein, and an upper end of the upper casing 30 is covered with a casing cover 31.

The lower casing 40 has a cylindrical shape, and is fastened to a casing combining part 11 of the base unit 10 with a screw. The lower casing 40 includes a cylinder accommodating part 41 to accommodate the cylinder unit 50 therein, a guide rail 45 to slidingly support a reinforcing member 35 (to be described later), and a first rotation supporting part 42 provided in an upper part thereof and rotatably combined with a first pinion 72 of the gearing unit 70 (refer to FIG. 7).

The upper casing 30 has a cylindrical shape and is provided on an outer circumference of the lower casing 40, and the casing cover 31 covers the upper end of the upper casing 30. The casing cover 31 is fastened to the upper end of the upper casing 30 with a screw, and includes a cylinder combining part 32 combined to an upper end of the cylinder 51. The casing cover 31 also includes a reinforcing member combining part 33 combined to an upper end of the reinforcing member 35 (refer to FIG. 6). Thus, the upper casing 30 is lifted up and lowered down together with the display main body 1 because the cylinder 51 fastened to the display main body 1 by the hinge unit 90 is combined to the casing cover 31 fastened to the upper casing 30.

Figure 5:
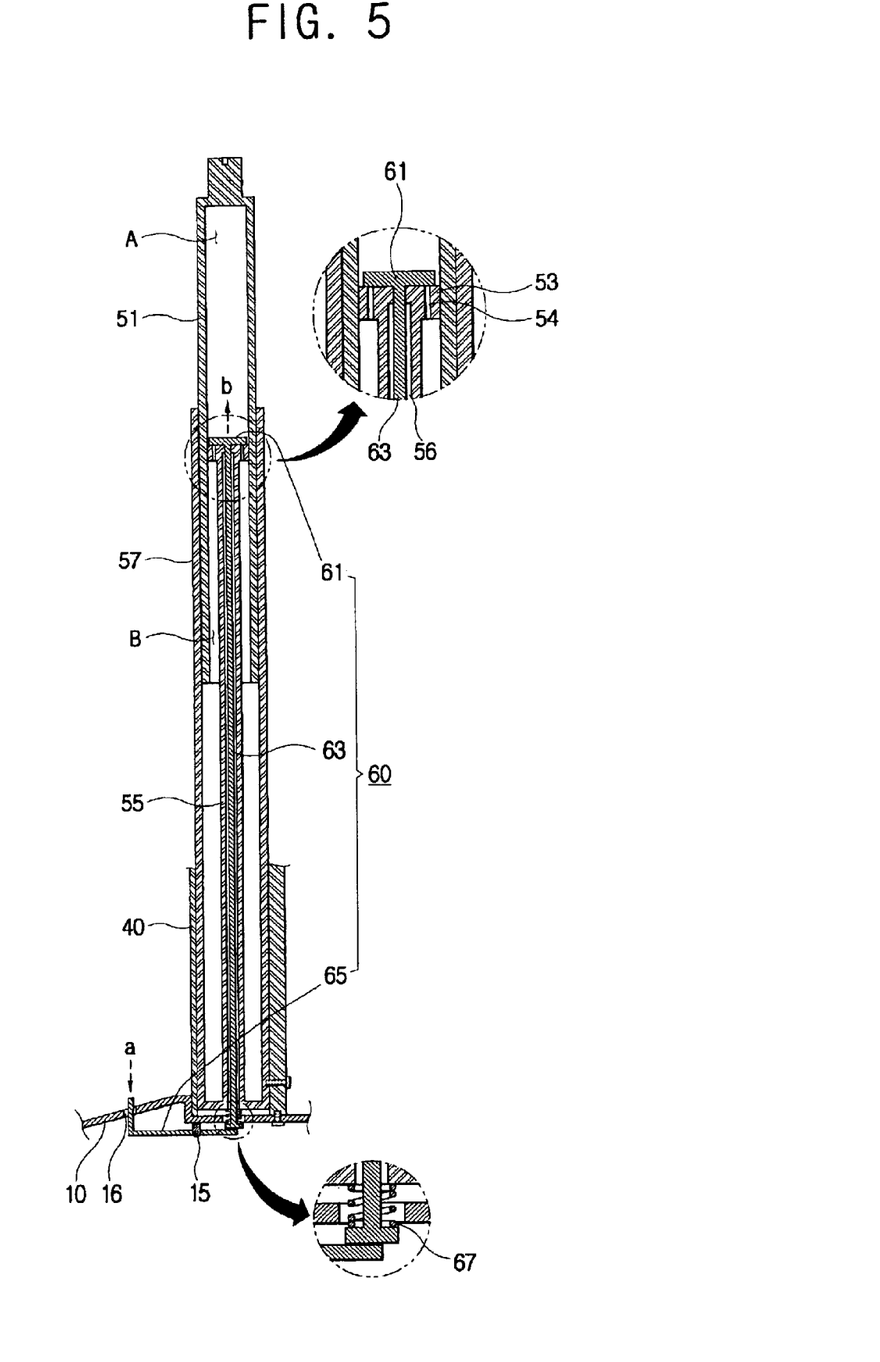
FIG. 5 is a sectional view of a cylinder unit shown in FIG. 3.
Figure 6:
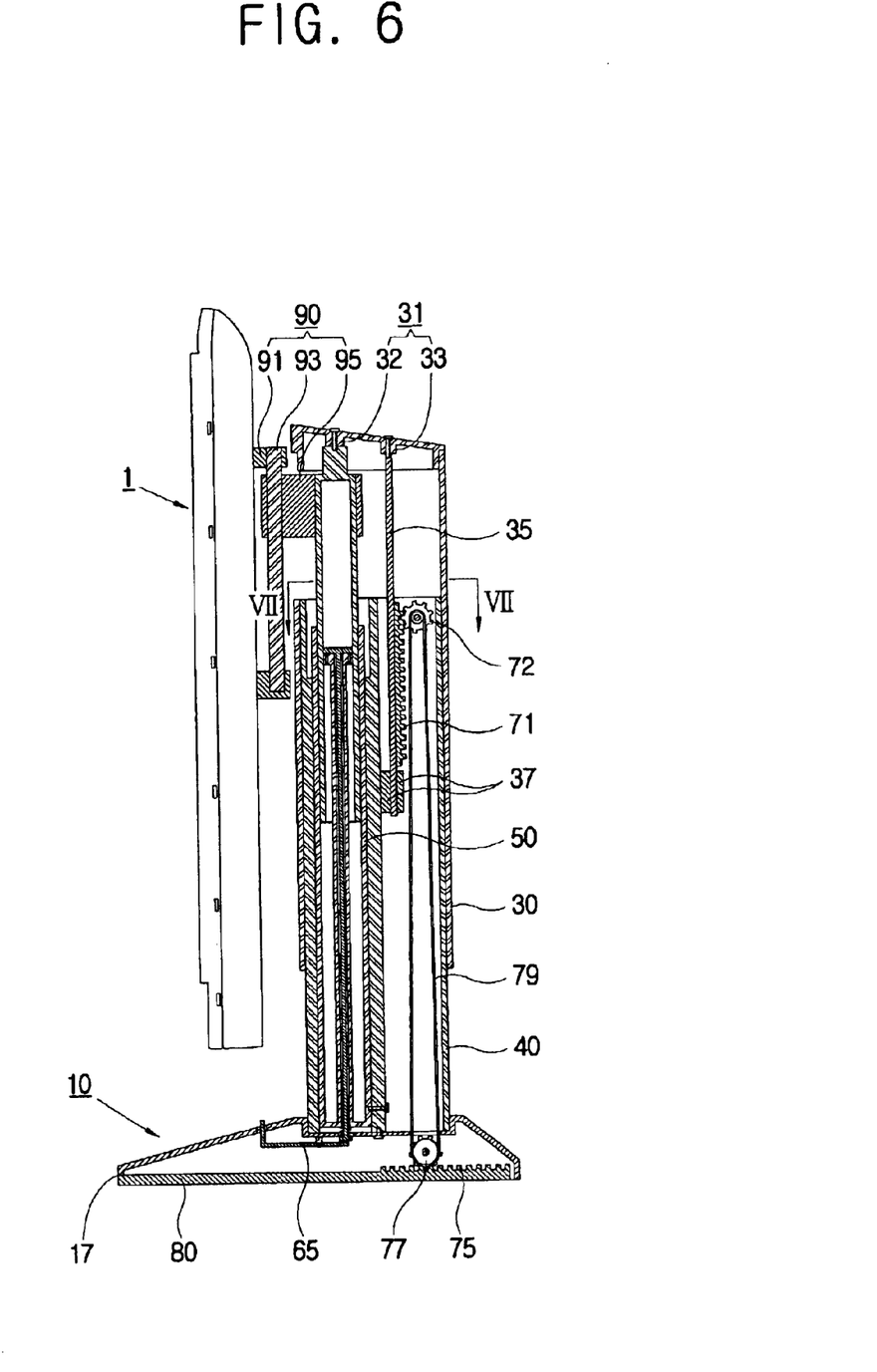
FIG. 6 is a side sectional view of the display apparatus shown in FIG. 3.

Referring to FIGS. 5 and 6, the base unit 10 has an approximately rectangular shape and includes the casing combining part 11 provided on an upper surface thereof, and combined with the lower part of the lower casing 40 to be accommodated in the casing combining part 11. The base unit 10 also includes an auxiliary base part gate 17 through which the auxiliary base part 80 (to be described later) is ejected from and inserted in the base unit 10. The base unit 10 includes a valve lever fulcrum 15 provided inside the base unit 10 to pivot a valve control lever 65 of a valve unit 60 (to be described later), and a valve control lever hole 16 formed on the upper surface of the base unit 10 to allow a user to control the valve lever 65 which protrudes therethrough.

As shown in FIGS. 4 through 6, the cylinder unit 50 according to the present invention includes the cylinder 51 filled with a high-pressure gas, a piston 53 dividing the cylinder 51 into "A" and "B" chambers and sliding up and down in the cylinder 51, and a piston rod 55 inserted in a lower part of the cylinder 51 and coupled to the bottom part of the piston 53. The cylinder unit 50 also includes a cylinder cover 57 to accommodate and support the cylinder 51 and the piston rod 55, and the valve unit 60 to open and close a passageway between the "A" and "B" chambers (see FIG. 5).

The cylinder 51 is fastened into the second cylinder part 97 of the hinge bracket 95 at the upper part thereof, and is fastened to the cylinder combining part 32 of the casing cover 31 which is combined to the upper casing 30 at its upper end. The piston 53 slides inside the cylinder 51, with the cylinder 51 being hermetically divided by the piston 53 into the "A" and "B" chambers. The piston 53 includes a plurality of through holes 54 which are arranged in a lengthwise direction of the cylinder 51 to serve as a passageway for the high-pressure gas, and are opened and closed by a valve 61 (to be described later). The piston rod 55 includes an upper end coupled to the bottom part of the piston 53, a lower end coupled to the cylinder cover 57, and a valve rod accommodating part 56 formed therein in a lengthwise direction thereof, which is shaped like a pipe and accommodates a valve rod 63 (to be described later). Thus, when the cylinder 51 is lifted up and down against the piston rod 55, the display main body 1, the upper casing 30, and the reinforcing member 35 which are combined to the cylinder 51 are also lifted up and lowered down as one body.

As shown in FIG. 6, the reinforcing member 35 has an upper part combined to the reinforcing member combining part 33 of the casing cover 31 of the upper casing 30 with a screw, and a lower part provided with a contact pad 37 accommodated and sliding in the guide rail 45 of the lower casing 40. On the reinforcing member 35 is provided a first rack 71 having teeth thereon, to mesh with teeth of the first pinion 72 of the gearing unit 70 (to be described later). The contact pad 37 is provided on each lower side of the reinforcing member 35, and between the contact pad 37 and the guide rail 45 is preferably introduced a lubricant substance to facilitate sliding. Thus, the reinforcing member 35, together with the cylinder unit 50, guides and supports the cylinder unit 50, when the display main body 1 is lifted up and lowered down.

The valve unit 60 includes the valve 61 disposed on an upper surface of the piston 53, to open and close the through holes 54 of the piston 53. The valve unit 60 also includes the valve rod 63 accommodated in the valve rod accommodating part 56 of the piston rod 55 and having an upper end coupled to the valve 61. The valve unit 60 includes a valve control lever 65 to contact with the lower end of the valve rod 63 to protrude through the valve control lever hole 16 of the base unit 10 so as to allow the user to control the valve 61.

The valve 61 is shaped like a circular plate, and a bottom surface thereof is coupled to the upper end of the valve rod 63. The lower end of the valve rod 63 is provided with an elastic member 67 such as a spring so as to elastically restore the valve 61 to a closing position. A lower end of the elastic member 67 is in contact with one end of the valve control lever 65. The other end of the valve control lever 65 protrudes through the valve control lever hole 16 of the base unit 10. A middle part of the valve control lever 65 is supported by the valve lever fulcrum 15 provided inside the base unit 10.

With the configuration as described above, when the valve control lever 65 protruded through the valve control lever hole 16 of the base unit 10 is pushed in a direction of "a" (refer to FIG. 5) with a force enough to overcome the elasticity of the elastic member 67, the valve control lever 65 is pivoted on the valve lever fulcrum 15 and pushes the valve rod 63 in a direction of "b" (refer to FIG. 5), so that the valve 61 is opened. Then, the high-pressure gas is moved inside the cylinder 51 through the through holes 54 of the piston 53 so as to equalize the pressure of the "A" and "B" chambers, so that the pressure is equally applied to both the upper and lower surfaces of the piston 53. An upper surface area of the piston 53 is larger than a lower surface area thereof, so that an area difference therebetween causes a force to act on the piston 53 in a downward direction. However, because the piston 53 is combined to the piston rod 55 fastened to the base unit 10 and cannot move, the cylinder 51 moves upward respective to the piston 53.

Thus, when the user pushes the valve control lever 65 in the direction of "a", the cylinder unit 50 causes a force to act on the display main body 1 in an upward direction. Herein, it is preferable that the force of the cylinder unit 50 to lift up the display main body 1 is approximately equal to a weight of the display main body 1. Therefore, the user may easily lift up and lowered down the display main body 1 against the base unit 10 with a small force.

Thereafter, when the user takes his/her hand off the valve control lever 65, the valve 61 is returned to the closing position by the elasticity of the elastic member 67, thereby closing the through holes 54 and dividing the "A" chamber from the "B" chamber. Then, the high-pressure gas stops moving inside the cylinder 51, so that the display main body 1 stops at a predetermined position.

Figure 7:
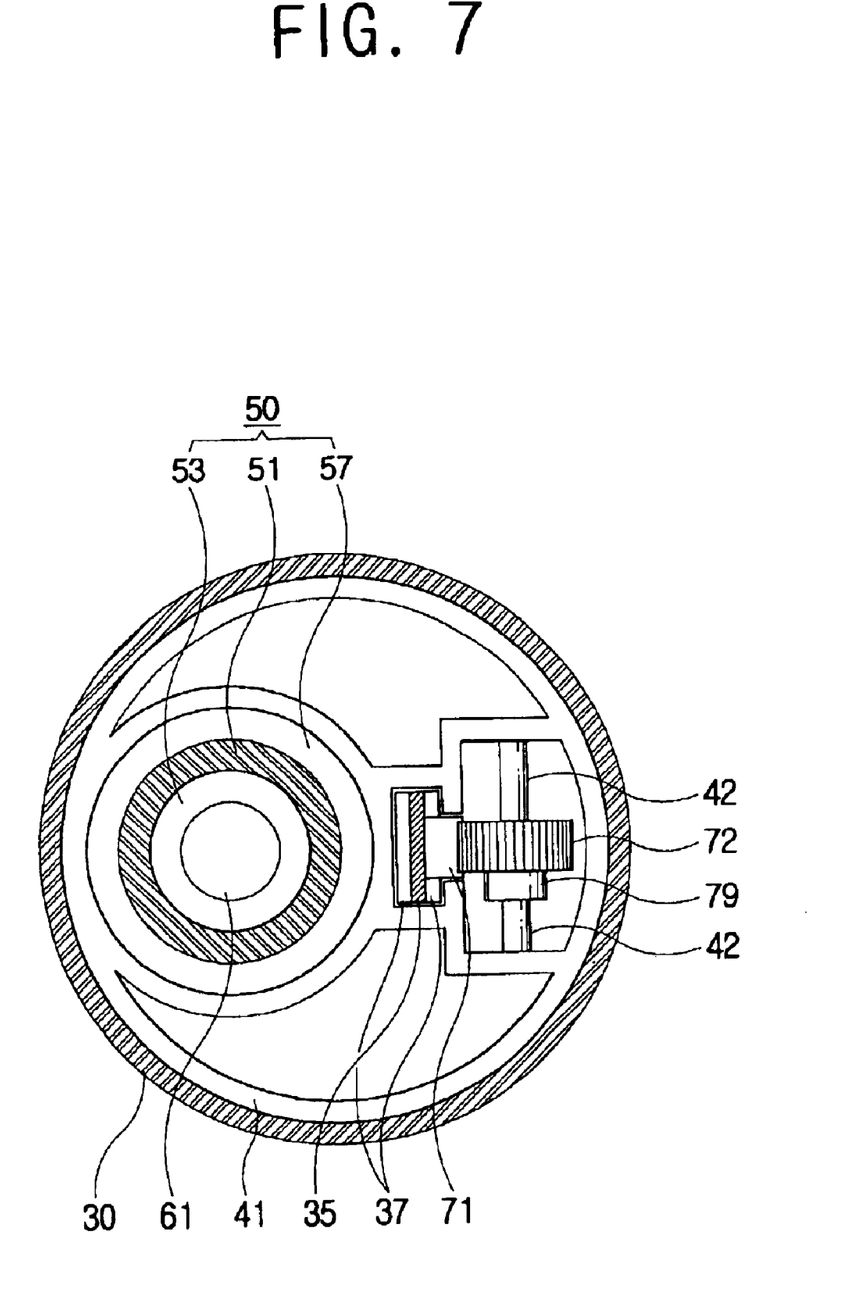
FIG. 7 is a cross sectional view of the display apparatus, taken along line VII—VII in FIG. 6.
Figure 8:
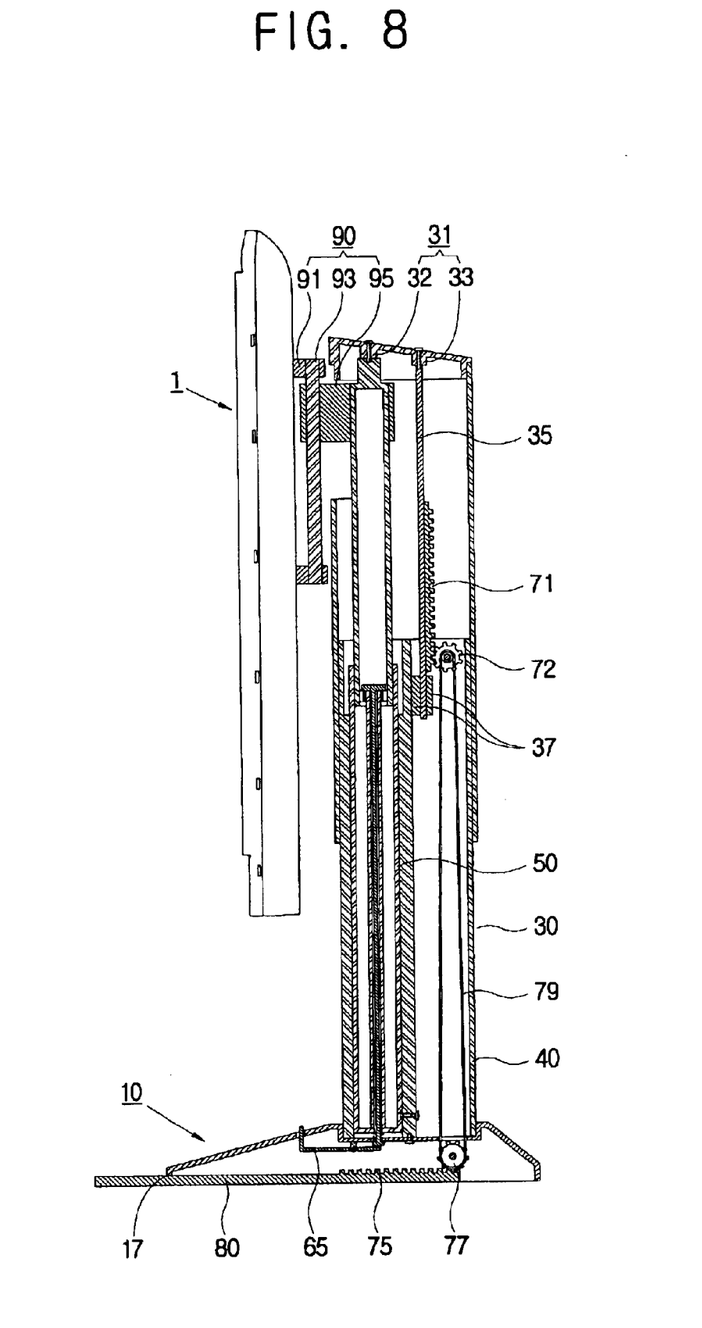
FIG. 8 is a side sectional view of the display apparatus lifted up in FIG. 6.

As shown in FIGS. 6 through 8, the gearing unit 70 includes the first rack 71 provided on the reinforcing member 35 in a longitudinal direction of the reinforcing member 35, and the first pinion 72 rotatably combined to the first rotation supporting part 42 to mesh with the first rack 71, and to rotate accordingly as the upper casing 30 is lifted up and lowered down. The gearing unit 70 also includes a second pinion 77 rotatably provided inside the base unit 10, a belt 79 to transmit the rotary motion of the first pinion 72 to the second pinion 77, the auxiliary base part 80 provided under the base unit 10 and ejected from and inserted in the base unit 10 according to the rotation of the second pinion 77, and a second rack 75 provided on an upper surface of the auxiliary base part 80 in the ejecting and inserting direction of the auxiliary base part 80 to mesh with the second pinion 77.

Attached to the first and second pinions 72 and 77 are first and second pulleys 72*a* and 77*a* connected by the belt 79, respectively (see FIG. 4). The first and second pulleys 72*a* and 77*a* have a cylindrical shape with either an even surface, a V-shaped groove, teeth, etc., to correspond to a cross-sectional shape of the belt 79.

The belt 79 is flexible and connects the first and second pulleys 72*a* and 77*a*. The belt 79 passes through a through hole (not shown) of the casing combining part 11 provided on the base unit 10. The belt 79 has a V-shaped cross section, teeth, etc., so as to effectively transmit the rotary motion of the first pinion 72 to the second pinion 77. The second pinion 77 is rotatably combined to the base unit 10 and is rotated by the rotary motion transmitted from the first pinion 72 through the belt 79. The rotary motion of the second pinion 77 is transmitted to the second rack 75 provided on the auxiliary base part 80, so that the auxiliary base part 80 is ejected from and inserted in the base unit 10.

With the configuration as described above, in the display apparatus of the present invention, the display main body 1 is lifted up from the state as shown in FIG. 6 to the state as shown in FIG. 8, as follows.

First, when the user pushes the valve control lever 65 protruded through the valve control lever hole 16 of the base unit 10, the valve 61 of the cylinder unit 50 is opened. Then, the cylinder unit 50 causes a force to act on the display main body 1 in the upward direction. Herein, it is preferable that the force of the cylinder unit 50 to lift up the display main body 1 is approximately equal to the weight of the display main body 1. Therefore, the user may easily lift up the display main body 1 against the base unit 10 with a small force. Accordingly, as the display main body 1 is lifted up, the reinforcing member 35 provided in the upper casing 30 is also lifted up, with the first rack 71 being combined to the reinforcing member 35. When the first rack 71 is lifted up together with the reinforcing member 35, the first pinion 72 to mesh with the first rack 71 is rotated and the rotary motion of the first pinion 72 is transmitted to the second pinion 77 by the belt 79. Then, the second rack 75 to mesh with the second pinion 77 goes forward, so that the auxiliary base part 80 combined to the second rack 75 is ejected from the base unit 10 through the auxiliary base part gate 17. Herein, a rotation ratio of the first pinion 72 to the second pinion 77 corresponds to a diameter ratio of the first pulley 72*a* to the second pulley 77*a*. Therefore, if a movement of the display main body 1 is relatively larger than that of the auxiliary base part 80, a mutual movement between the display main body 1 and the auxiliary base part 80 may be optimized by shortening a diameter of the first pulley 72*a* respective to the second pulley 77*a*. Thus, in the display apparatus of the present invention, a size of the base unit 10 is designed with respect to the LCD display main body 1 having the lowest height, so that the base unit 10 occupies a relatively small space and the display main body 1 is stably supported by the auxiliary base part 80 ejected from the base unit 10 with respect to the height of the display main body 1.

Oppositely, a process of lowering down the display main body 1 is achieved by pushing the valve control lever 65 so as to open the valve 61 of the cylinder unit 50 and by pressing the display main body 1 downward.

Figure 9:
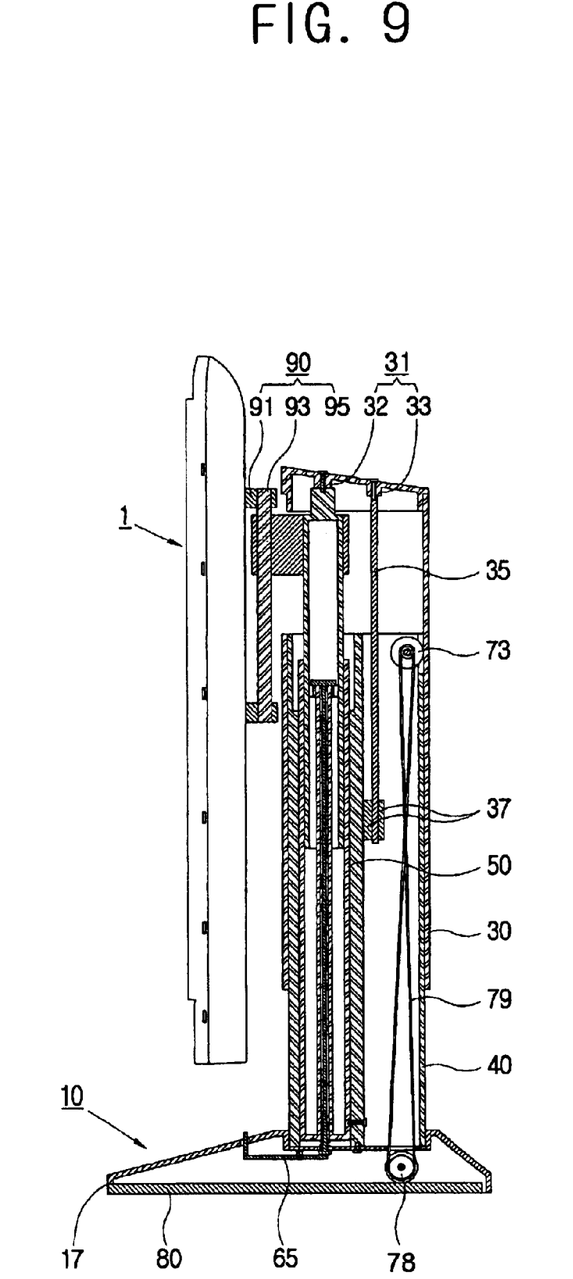
FIG. 9 is a side sectional view of a display apparatus, according to another embodiment of the present invention.

FIG. 9 is a side sectional view of a display apparatus, according to another embodiment of the present invention. The display apparatus includes first and second rollers 73 and 78 instead of the first and second pinions 72 and 77 and the first and second racks 71 and 75. Herein, the first roller 73 is in rolling-contact with the upper casing 30 or the reinforcing member 35. Thus, a rotary motion of the first roller 73 is transmitted to the second roller 78 by the belt 79, and a rotary motion of the second roller 78 being in rolling-contact with the upper surface of the auxiliary base part 80 allows the auxiliary base part 80 to be ejected from or inserted in the base unit 10. In this case, a structure of the display apparatus according the embodiment of the present invention is made simpler.

As described above, the display apparatus according to the present invention includes a display main body, a base unit to support the display main body, a cylinder unit to support the display main body to be lifted up and lowered down, a gearing unit to cooperate with the up and down movement of the display main body, and an auxiliary base part which is ejected from and inserted in the base unit according to an operation of the gearing unit. Thus, the base unit to support the display main body is minimized and a size of the base unit is easily changed by the auxiliary base part according to a height of the display main body.

Further, the display apparatus according to the present invention includes a reinforcing member, so that the display main body is more stably supported. Further, the cylinder unit is operated by a valve unit, so that a structure of the display apparatus becomes simple, a fine height control is provided, and the display main body is easily lifted up and lowering down by a small force.

Although a few preferred embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. A display apparatus having a display main body provided with a screen, and a base unit to support the display main body, comprising:

a supporting unit provided between the display main body and the base unit to support the display main body to be lifted up and lowering down;

a gearing unit operated by the lifting/lowering of the display main body; and an auxiliary base part to eject from and insert in the base unit according to an operation of the gearing unit, wherein the supporting unit includes:

a cylinder unit including a cylinder filled with high-pressure gas;

a piston dividing the cylinder into two chambers to slide up and down in the cylinder;

a piston rod inserted in a lower part of the cylinder and coupled to a bottom part of the piston; and a cylinder cover to accommodate and support the cylinder and the piston rod.

2. The display apparatus according to claim 1, wherein an upper part of the cylinder is combined to the display main body, and a lower part of the piston is combined to the base unit.

3. The display apparatus according to claim 2, wherein the cylinder unit comprises:

a valve disposed on the piston to open and close a passageway between the two chambers divided by the piston.

4. The display apparatus according to claim 3, wherein the cylinder unit further comprises:

a valve rod accommodated in a valve rod accommodating part formed inside the piston rod in a longitudinal direction, having an upper end coupled to the valve; and a valve control lever coupled to a lower end of the valve rod to protrude from the base unit so as to open and close the valve.

5. The display apparatus according to claim 1, further comprising:

a lower casing to accommodate the cylinder unit and to combine to the base unit; and an upper casing to accommodate the lower casing and to combine to the display main body to be lifted up and lowering down, wherein an upper end of the upper casing is covered with a casing cover.

6. The display apparatus according to claim 5, wherein the gearing unit comprises:

a first roller rotatably combined to an upper part of the lower casing to be rotated depending on the up and down lifting/lowering of the upper casing;

a second roller rotatably combined to the base unit; and a belt to transmit a rotary motion of the first roller to the second roller, wherein the auxiliary base part is ejected from and inserted in the base unit depending upon the rotary motion of the second roller.

7. The display apparatus according to claim 6, further comprising:

a reinforcing member accommodated in the upper casing and fastened to an upper part of the upper casing; and a guide rail provided in the lower casing to slidingly support a reinforcing member.

8. The display apparatus according to claim 7, wherein the reinforcing member is provided with a contact pad on a lower part thereof so as to be accommodated and to slide in the guide rail of the lower casing.

9. The display apparatus according to claim 8, wherein the reinforcing member is provided with a first rack in a lengthwise direction thereof, and the first roller has a first pinion to mesh with the first rack.

10. The display apparatus according to claim 9, wherein the auxiliary base part is provided with a second rack in an ejecting and inserting direction thereof, and the second roller has a second pinion to mesh with the second rack.

11. The display apparatus according to claim 2, further comprising:

a hinge unit provided between the display main body and the cylinder unit to swivel the display main body about the cylinder unit.

12. The display apparatus according to claim 11, wherein the hinge unit comprises:

a pair of main body brackets fastened to a rear of the display main body;

a hinge shaft rotatably combined to the main body brackets; and a hinge bracket having a first cylinder part coupled to the hinge shaft and a second cylinder part coupled to an upper part of the cylinder unit, the hinge bracket rotatably combining the hinge shaft to the upper part of the cylinder of the cylinder unit.

13. The display apparatus according to claim 12, wherein the main body brackets have a hinge hole in which the hinge shaft is rotatably inserted.

14. The display apparatus according to claim 13, wherein the hinge shaft is shaped like a rod so that opposite ends thereof are disposed in the hinge hole and a middle part thereof is fastened into the first cylinder part of the hinge bracket.

15. The display apparatus according to claim 5, wherein the lower casing has a cylindrical shape and is fastened to a casing combining part of the base unit, and the upper casing has a cylindrical shape and is provided an outer circumference of the lower casing.

16. The display apparatus according to claim 9, wherein the lower casing comprises:

a cylinder accommodating part to accommodate the cylinder unit; and a first rotation supporting part provided in an upper part thereof and rotatably combined with the first pinion of the gearing unit.

17. The display apparatus according to claim 8, wherein the casing cover comprises:

a cylinder combining part to combine to an upper end of the cylinder; and a reinforcing member combining part to combine to an upper end of the reinforcing member accommodated in the upper casing, to allow the upper casing to be lifted up and lowered down together with the display main body.

18. The display apparatus according to claim 4, wherein the base unit comprises:

an auxiliary base part gate through which the auxiliary base part is ejected from and inserted in the base unit;

a valve lever fulcrum provided inside the base unit to pivot the valve control lever; and a valve control lever hole provided on an upper surface of the base unit, thereby allowing control of the valve control lever which protrudes therethrough.

19. The display apparatus according to claim 8, wherein when the cylinder is lifted up and lowered down against the piston rod, the display main body, the upper casing, and the reinforcing member which are all combined to the cylinder, are lifted up and lowered down altogether.

20. The display apparatus according to claim 18, wherein the lower end of the valve rod is provided with an elastic member such as a spring to elastically restore the valve to a closing position, thereby closing through holes of the piston and dividing the two chambers.

21. The display apparatus according to claim 20, wherein when the valve control lever is pushed, a force overcomes an elasticity of the elastic member, thereby allowing the valve to open and causing a force of the cylinder unit to act on the display main body in an upward direction.

22. The display apparatus according to claim 21, where the force of the cylinder unit to lift up the display main body is equal to a weight of the display main body.

23. The display apparatus according to claim 10, wherein a first and second pulley are attached to the first and second pinion, respectively, and are connected by the belt to transmit a rotary motion of the first pinion to the second pinion.

* * * * *